United States Patent
Uchiyama et al.

(10) Patent No.: US 9,895,987 B2
(45) Date of Patent: Feb. 20, 2018

(54) CHARGING-PORT CONTROL DEVICE FOR ELECTRIC VEHICLE

(71) Applicant: Nissan Motor Co., Ltd., Kanagawa (JP)

(72) Inventors: Hirofumi Uchiyama, Tokyo (JP); Hiroyuki Ohya, Kanagawa (JP); Tsuyoshi Nakajima, Kanagawa (JP)

(73) Assignee: NISSAN MOTOR CO., LTD., Kanagawa (JP)

( * ) Notice: Subject to any disclaimer, the term of this patent is extended or adjusted under 35 U.S.C. 154(b) by 554 days.

(21) Appl. No.: 14/385,414

(22) PCT Filed: Feb. 20, 2013

(86) PCT No.: PCT/JP2013/054137
§ 371 (c)(1),
(2) Date: Sep. 15, 2014

(87) PCT Pub. No.: WO2013/136928
PCT Pub. Date: Sep. 19, 2013

(65) Prior Publication Data
US 2015/0035478 A1   Feb. 5, 2015

(30) Foreign Application Priority Data
Mar. 14, 2012   (JP) ................. 2012-056590

(51) Int. Cl.
*H02J 7/00* (2006.01)
*H01R 13/62* (2006.01)
(Continued)

(52) U.S. Cl.
CPC ........... *B60L 11/1818* (2013.01); *B60L 1/003* (2013.01); *B60L 3/0023* (2013.01);
(Continued)

(58) Field of Classification Search
CPC ....... Y02E 60/12; H02J 7/0042; H02J 7/0045; H01M 10/44; H01M 10/46;
(Continued)

(56) References Cited

U.S. PATENT DOCUMENTS 5,536,173 A    7/1996  Fujitani et al.
6,157,162 A *  12/2000 Hayashi .............. B60L 11/1818
                                                   320/104

(Continued)

FOREIGN PATENT DOCUMENTS

EP    0635908 A2    1/1995
EP    2400601 A1   12/2011
(Continued)

OTHER PUBLICATIONS

International Search Report issued in PCT/JP2013/054137 dated May 28, 2013 (4 pages).

(Continued)

*Primary Examiner* — Yalkew Fantu
*Assistant Examiner* — Mohammed J Sharief
(74) *Attorney, Agent, or Firm* — Osha Liang LLP (57) ABSTRACT

A charging-port control device for an electric vehicle includes a charging port engaged with a charging connector, a locking mechanism configured to limit release of an engagement state between the charging connector and the charging port, and a lock state control unit configured to control the locking mechanism to a lock state or an unlock state. The lock state control unit includes a first mode for controlling the locking mechanism to the lock state only when a charge request is being outputted from a vehicle side and a third mode for maintaining a full-time unlock state.

22 Claims, 7 Drawing Sheets (51) Int. Cl.

| | | |
|---|---|---|
| *H01R 13/44* | (2006.01) | |
| *B60L 11/18* | (2006.01) | |
| *H01R 13/639* | (2006.01) | |
| *B60L 1/00* | (2006.01) | |
| *B60L 3/00* | (2006.01) | |
| *H01R 13/627* | (2006.01) | |

(52) U.S. Cl.
CPC ....... B60L 11/1825 (2013.01); B60L 11/1861 (2013.01); B60L 11/1875 (2013.01); B60L 11/1877 (2013.01); H01R 13/639 (2013.01); B60L 2230/12 (2013.01); B60L 2240/12 (2013.01); B60L 2240/34 (2013.01); B60L 2240/423 (2013.01); B60L 2240/80 (2013.01); B60L 2250/16 (2013.01); B60L 2260/58 (2013.01); B60L 2270/32 (2013.01); B60L 2270/34 (2013.01); H01R 13/6275 (2013.01); H01R 2201/26 (2013.01); Y02T 10/642 (2013.01); Y02T 10/7005 (2013.01); Y02T 10/705 (2013.01); Y02T 10/7044 (2013.01); Y02T 10/7088 (2013.01); Y02T 90/121 (2013.01); Y02T 90/128 (2013.01); Y02T 90/14 (2013.01)

(58) Field of Classification Search
CPC ............ H01R 13/6397; H01R 13/6275; H01R 2103/00; H01R 13/60; H01R 13/447; H01R 23/025; B60L 11/1818; G05B 19/042; G05B 19/0426; G05B 15/02; G05B 2219/25428; G05B 19/056
USPC ............ 320/107; 439/304, 310, 133; 700/17
See application file for complete search history.

(56) References Cited

U.S. PATENT DOCUMENTS

| | | | | |
|---|---|---|---|---|
| 6,695,085 B2* | 2/2004 | Mackle | ................ | B62D 15/027 180/167 |
| 6,812,851 B1* | 11/2004 | Dukach | .................. | G06Q 30/02 340/425.5 |
| 8,075,329 B1* | 12/2011 | Janarthanam | ....... | B60L 11/1818 439/304 |
| 2006/0030982 A1* | 2/2006 | Szczerba | ................ | B60K 37/06 701/36 |
| 2009/0082916 A1* | 3/2009 | Tanaka | ...................... | B60K 6/48 701/22 |
| 2010/0120581 A1 | 5/2010 | Mitsutani et al. | | |
| 2012/0135626 A1* | 5/2012 | Tormey | ................. | B60L 3/0069 439/345 |
| 2013/0069589 A1* | 3/2013 | Kai | ....................... | H02J 7/0042 320/109 |

FOREIGN PATENT DOCUMENTS

| | | | |
|---|---|---|---|
| GB | 2455551 A | | 6/2009 |
| JP | 7-37644 A | | 2/1995 |
| JP | 2007-288894 A | | 11/2007 |
| JP | 2009-081917 A | | 4/2009 |
| JP | 2010-119168 A | | 5/2010 |
| JP | 2010-148247 A | | 7/2010 |
| JP | 2010-161881 A | | 7/2010 |
| JP | 2011-238530 A | | 11/2011 |
| JP | 2012-050220 A | | 3/2012 |
| JP | 2012050220 A | * | 3/2012 |
| WO | 2010-060370 A1 | | 6/2010 |
| WO | 2010-137144 A1 | | 12/2010 |

OTHER PUBLICATIONS

Extended European Search report issued in corresponding European Application No. 13760884.0, dated Feb. 16, 2015 (5 pages).

* cited by examiner

CHARGING-PORT CONTROL DEVICE FOR ELECTRIC VEHICLE

CROSS-REFERENCE TO RELATED APPLICATIONS

This application is a National Stage application of International Patent Application No. PCT/JP2013/054137, filed on Feb. 20, 2013, which claims to Japanese Patent Application No. 2012-056590, filed on Mar. 14, 2012. Both Japanese Patent Application No. 2012-056590 and International Patent Application No. PCT/JP2013/054137 are hereby incorporated by reference in their entirety.

TECHNICAL FIELD

The present invention relates to a charging-port control device for an electric vehicle, which is capable of locking connection when connecting a charging connector to a charging port used in charging a battery mounted on the vehicle.

BACKGROUND ART

As a technique related to the charging-port control device for the electric vehicle, it has been disclosed in a Patent Document 1. This publication discloses a technique of locking the charging connector and a connector cover locking mechanism in conjunction with or in synchronization with a door lock in a vehicle that is capable of being charged externally, with the aim of avoiding theft of a charging cable.

Here, as an external charging-capable place which becomes widespread currently, there are a charging place (hereinafter called an occupancy-capable area) like a home which can be occupied and a public charging place (hereinafter called an occupancy-incapable area) like a charging station (a charging stand) which can not be occupied. Considering such background, in the occupancy-capable area, it is required to avoid the theft of the charging cable. On the other hand, in the occupancy-incapable area, besides avoiding the theft of the charging cable, a state in which anyone can freely attach and detach the charging cable when the charge is completed and many users can efficiently do the charge is required. In other words, if the charging cable is continuously locked even after the charge is completed, a problem that others can not do the charge until a driver returns and the lock is released occurs.

CITATION LIST

Patent Document

Patent Document 1: Japanese Patent Provisional Publication Tokkai No. 2009-081917

SUMMARY OF THE INVENTION

The present invention was made in view of the above problem, and an object of the present invention is to provide a charging-port control device for the electric vehicle, which is capable of increasing a charging efficiency in public charging facilities while avoiding the theft of the charging cable.

To achieve the object, when an engaging portion of a charging connector and an engaged portion of a charging port are in an engagement state, a charging-port control device for the electric vehicle of the present invention limits a releasing operation of the engaging state. Upon controlling a locking mechanism that achieves a lock state in which the release of the engagement state is restrained and an unlock state in which the releasing operation is allowed, only when a charge request is being outputted from a vehicle side, the charging-port control device sets the locking mechanism to the lock state.

Accordingly, since a situation in which the charging connector is unexpectedly released during the charge can be avoided, it is possible to prevent the theft of the charging cable and to avoid the situation in which the charge is not completed yet when the driver comes back after the scheduled charging time elapses. Further, it is possible to increase a charging efficiency in the public charging facilities.

DESCRIPTION OF EMBODIMENTS

Embodiment 1

Figure 1:
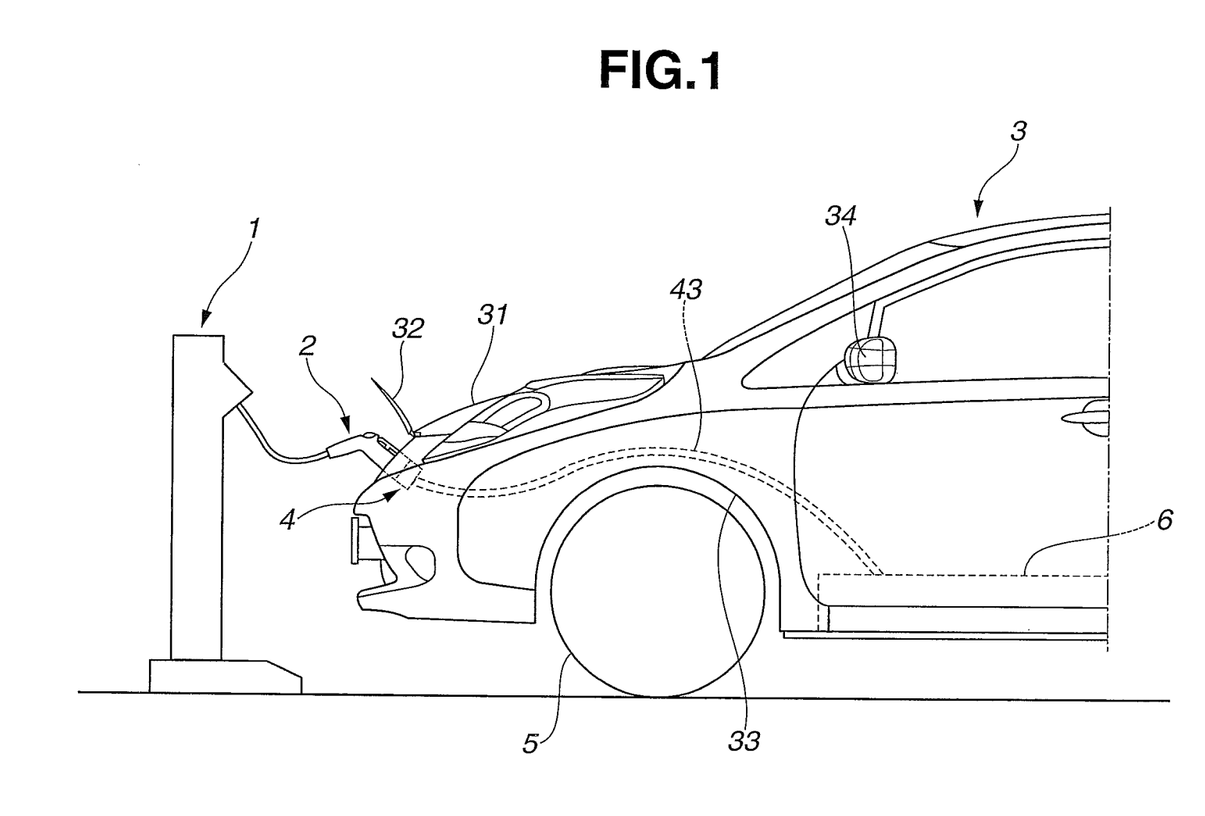
FIG. 1 is a schematic view showing a state of charge of a vehicle that is provided with a charging-port control device for an electric vehicle according to an embodiment 1.

FIG. 1 is a schematic view showing a state of charge of a vehicle that is provided with a charging-port control device for an electric vehicle of an embodiment 1. On a front side of a vehicle 3, a charging port 4 that is electrically connected to a vehicle-mounted battery 6 mounted on a floor of the vehicle 3 through a cable 43 is provided on a front side with respect to a bonnet hood 31. This charging port 4 is provided in a position that is substantially the same height as an upper edge of a tire wheel arch 33 and is lower than a side mirror 34. The charging port 4 is closed by a charging lid 32 in non-charging state. A charging stand 1 is provided with a charging connector 2 for power supply. When performing the charge, by opening the charging lid 32 and inserting the charging connector 2 into the charging port 4 and connecting them, the charge is performed.

Figure 2:
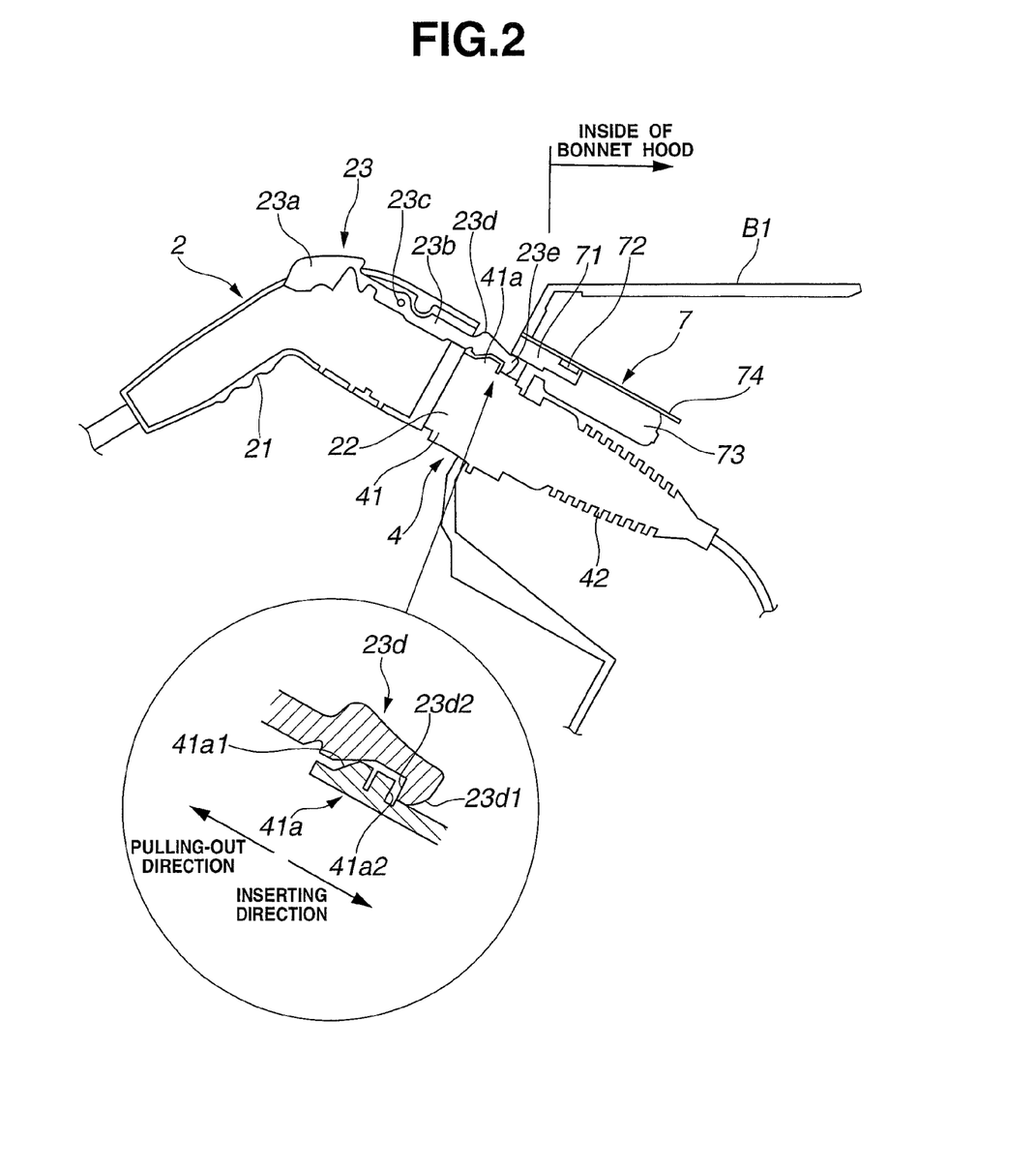
FIG. 2 is a schematic sectional view showing a state in which a charging connector and a charging port are connected, of the embodiment 1.

FIG. 2 is a schematic sectional view showing a state in which the charging connector and the charging port are connected, of the embodiment 1. The charging port 4 has an inserted member (or a connector receiving member) 41 which is fixed to a body-forming member B1 on the vehicle side through a bracket 74 and into which the charging connector 2 is inserted, the cable 43 which is connected to the inserted member 41 inside a vehicle body, and a tube 42 which covers a connecting part of this cable 43. A protrusion 41a is formed at an outer circumference of the inserted member 41. Further, an insertion hole into which an inserting portion 22 of the charging connector 2 can be inserted only in a predetermined positional relationship between the inserting portion 22 and the insertion hole is formed at an inner circumference of the inserted member 41.

The charging connector 2 is a type of connector that is installed generally and widely, and is a standardized connector whose format (arrangement) and size are determined by a unified standard. The charging connector 2 is connected to the charging port 4 of the vehicle by an operator. The charging connector 2 has a grip portion 21 that the operator grips, the inserting portion 22 that is inserted into the charging port 4 on the vehicle side, and an engagement member 23 that allows engagement and disengagement (release) between the charging connector 2 and the charging port 4 by the operator. The engagement member 23 restrains or limits a movement of the charging connector 2 in a direction that pulls out the charging connector 2 from the charging port 4 by engaging with the protrusion 41a provided on the charging port 4 side when the charging connector 2 is connected to the charging port 4.

The engagement member 23 is a member that turns on a supporting point 23c fixed to a case member of the charging connector 2. The engagement member 23 is forced by an elastic member (not shown) so that a release button 23a is positioned at an upper side in FIG. 2 (so that a nail portion 23d is positioned at a lower side in FIG. 2). The release button 23a is provided at an edge portion on the grip portion 21 side so that the operator can push or press the release button 23a while gripping the grip portion 21. On the other hand, the nail portion 23d engaging with the protrusion 41a is provided at an edge portion on the inserting portion 22 side. The nail portion 23d has a claw shape having a curved surface portion 23d1, at a tip portion of the nail portion 23d, which is shaped into a smooth curved surface to an inserting direction and a stepped portion 23d2 which has an acute angle with respect to the pulling-out direction. On the other hand, on an edge surface of the protrusion 41a, which faces to an outer side of the vehicle, an inclined surface 41a1 is formed. On an edge surface of the protrusion 41a, which faces to an inner side of the vehicle, an engagement surface 41a2 that is substantially perpendicular to the pulling-out direction is formed. The protrusion 41a has an anisotropic shape by these surfaces.

When inserting the charging connector 2 into the charging port 4, the curved surface portion 23dl of the tip portion of the nail portion 23d can get over or go over the inclined surface of the protrusion 41a without requiring a special operation of the release button 23a. Subsequently, when the stepped portion 23d2 has passed the engagement surface 41a2, the nail portion 23d is pressed downward (returns downward) by action of the elastic member (not shown), then the nail portion 23d and the protrusion 41a are engaged. Here, it is also possible to insert the charging connector 2 while pushing or pressing the release button 23a. With this engagement, even if the operator pulls the charging connector 2 in the pulling-out direction without operating the release button 23a, due to the fact that the stepped portion 23d2 and the engagement surface 41a2 are engaged, the movement in the pulling-out direction of the charging connector 2 is restrained. To release this engagement, by pushing or pressing the release button 23a, the engagement member 23 turns on the supporting point 23c, and the nail portion 23d moves upward with respect to the engagement surface 41a2, then the engagement is released.

Figure 3:
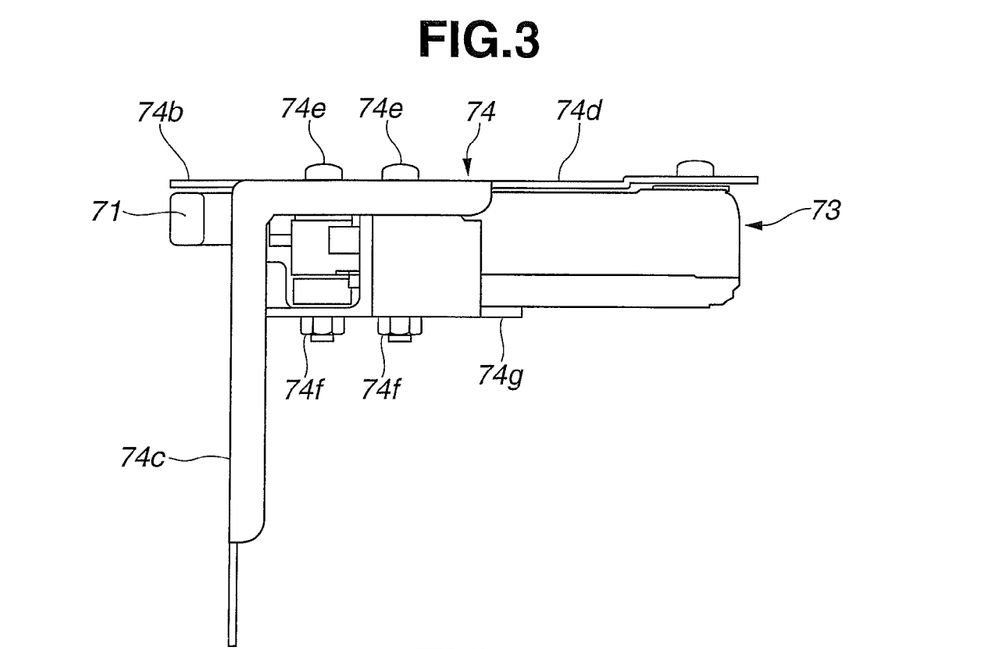
FIG. 3 is a side view showing a structure of a locking mechanism of the embodiment 1.
Figure 4:
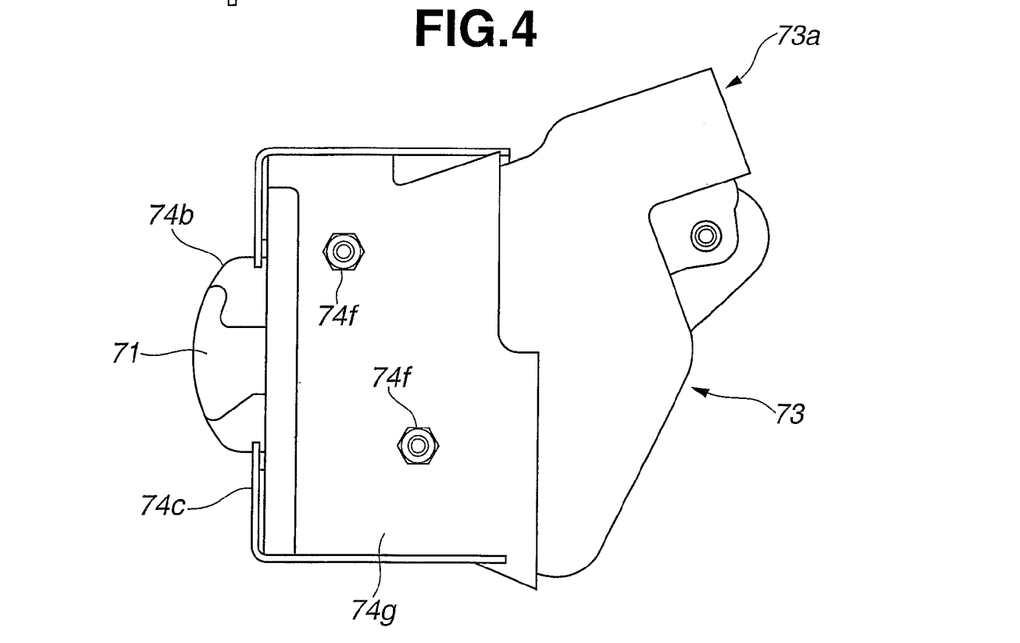
FIG. 4 is a bottom view showing the structure of the locking mechanism of the embodiment 1.

FIG. 3 is a side view showing a structure of a locking mechanism of the embodiment 1. FIG. 4 is a bottom view showing the structure of the locking mechanism of the embodiment 1.

A locking mechanism 7 that limits the turning of the engagement member 23 is provided above the charging port 4. The locking mechanism 7 has a swing arm 71 which, by being positioned in a direction in which the nail portion 23d is separated from the protrusion 41a, achieves a limiting state that limits the separation of the nail portion 23d from the protrusion 41a and which, by not being positioned in the direction of the separation of the nail portion 23d from the protrusion 41a, achieves a no-limiting state that does not limit the separation of the nail portion 23d from the protrusion 41a, a lock actuator 73 that drives this swing arm 71 and the bracket 74 that fixes and supports the lock actuator 73 and the inserted member 41 of the charging port 4.

As shown in the side view of FIG. 3 and the bottom view of FIG. 4, the bracket 74 has an upper surface portion 74d that fixes and supports the lock actuator 73 with a bolt 74e, a support extending portion 74b that extends from the upper surface portion 74d so as to cover a movable range of the swing arm 71, a side surface portion 74c that is bent at a substantially right angle to the upper surface portion 74d and secures the inserted member 41 etc. with a bolt, and a cover member 74g that is fixed from a side facing to the upper surface portion 74d and sandwiches the lock actuator 73 in cooperation with the upper surface portion 74d. The upper surface portion 74d, the lock actuator 73 and the cover member 74g are fixedly assembled by a plurality of bolts 74e and nuts 74f. On the upper surface portion 74d, a fail-time forced-operation opening 74a through which an after-mentioned fixing screw 72 can be operated is formed (see FIG. 2 etc.). The operator can screw the fixing screw 72 using a driver etc. by opening the bonnet hood.

Figure 6:
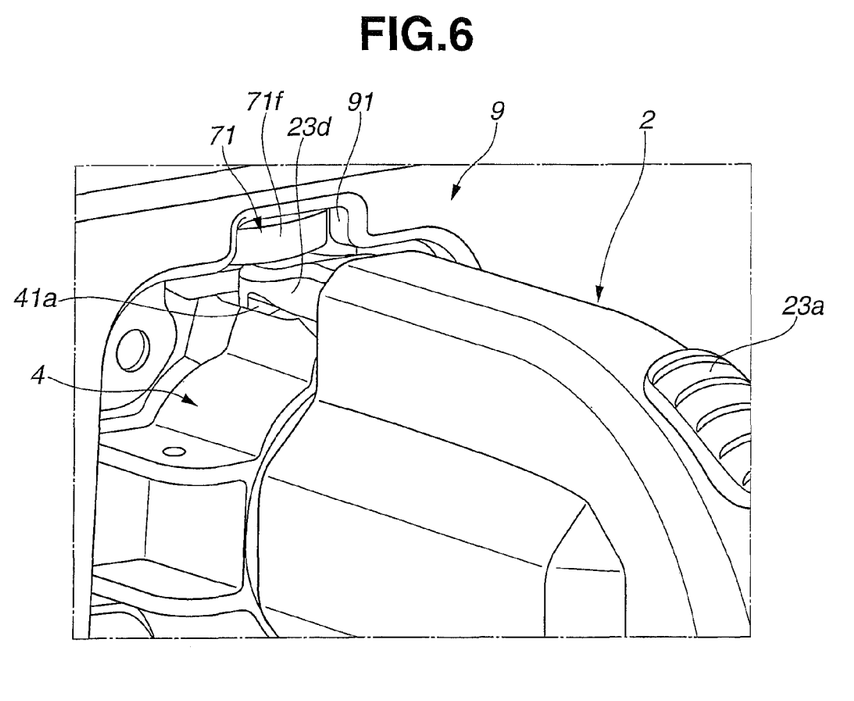
FIG. 6 is a perspective view of the state in which the charging connector and the charging port are connected, of the embodiment 1.

FIG. 6 is a perspective view of the state in which the charging connector and the charging port are connected, of the embodiment 1. By inserting the charging connector 2 into the charging port 4 and setting the position of the swing arm 71 to the separation direction of the nail portion 23d by the operation of the locking mechanism 7, even if the operator pushes or presses the release button 23a, the nail portion 23d can not move in the separation direction. With this operation, the engagement between the protrusion 41a and the nail portion 23d can not be released, thereby forbidding the pulling-out of the charging connector 2. At this time, to protect the locking mechanism 7 against entry of dust, a cover member 9 is provided at the charging port 4 of the vehicle. The cover member 9 covers the locking mechanism 7 from an insertion/pulling-out side of the charging connector 2, and has an opening 91 where the nail portion 23d can be inserted and a part of the swing arm 71 is exposed.

In a state in which, by inserting the charging connector 2 into the charging port 4 and operating the locking mechanism 7, the charge is started and the operator leaves a charging place, as shown in FIG. 6, an outermost diameter portion 71f of the swing arm 71 is exposed. If a gap between the cover member 9 and the outermost diameter portion 71f is great, it is possible to pry open the swing arm 71 forcibly by inserting a finger into the gap. Thus, the gap between the cover member 9 and the outermost diameter portion 71*f* is set to be narrow to the extent that these cover member 9 and outermost diameter portion 71*f* do not touch each other.

Further, in a state in which the removal of the charging connector 2 is restrained by the locking mechanism 7, the whole of the opening 91 is closed by the outermost diameter portion 71*f* of the swing arm 71. In other words, a length in a rotation direction of the outermost diameter portion 71*f* is set to be longer than an opening width (the rotation direction length) of the opening 91. The reason of this is because, as described above, a possibility of forcibly prying open the swing arm 71 by inserting the finger etc. into the gap is precluded in the case where the gap between an edge of the opening 91 and an edge of the swing arm 71 exists.

(Mode Selection Control Process of Locking Mechanism) Next, a control configuration of the locking mechanism 7 will be explained. First, a background that is required to control the operation of the locking mechanism 7 will be explained. As the charging stand, it is conceivable that there exist cases where the charging stand is installed at a place (an occupancy-capable area) like the home which can surely be occupied and is installed at a place (an occupancy-incapable area) such as the public charging stand where it is desirable that the vehicle immediately leave the charging stand after the charge is completed. In the occupancy-capable area, since the operating state of the locking mechanism 7 has no effect on others at all, from a viewpoint of avoidance of unexpected coming-out of the charging connector 2 by mischief, a second mode that is a mode setting the locking mechanism 7 to a lock state all the time (a full-time lock state) is selected. However, in the occupancy-incapable area, if the locking mechanism 7 is in the full-time lock state, when the others intend to do the charge, there arises a problem of inhibiting an act of the charge.

On the other hand, in a case of the charging stand that forbids locking, or in a case where the others want to release the lock when the locking mechanism 7 is in the lock state, since it is necessary that the locking mechanism 7 should be in a full-time unlock state, a third mode that is a mode setting the locking mechanism 7 to the full-time unlock state is selected. However, because anyone can remove or detach the charging connector 2 easily, there is a risk that the charging connector 2 will be released unexpectedly during the charge. Further, theft of the charging cable might happen, or there may arise a situation in which the charge is not completed yet when the driver comes back after a scheduled charging time elapses.

Thus, from viewpoints of prevention of the mischief and avoidance of the occupancy in the occupancy-incapable area, a first mode, which maintains the lock state of the locking mechanism 7 when the charge is in progress and sets the locking mechanism 7 to an unlock state when the charge is completed so that the others can detach the charging connector 2 and attach it to their own vehicle, is set. In the following description, a mode selection process of these modes will be explained.

Figure 5:
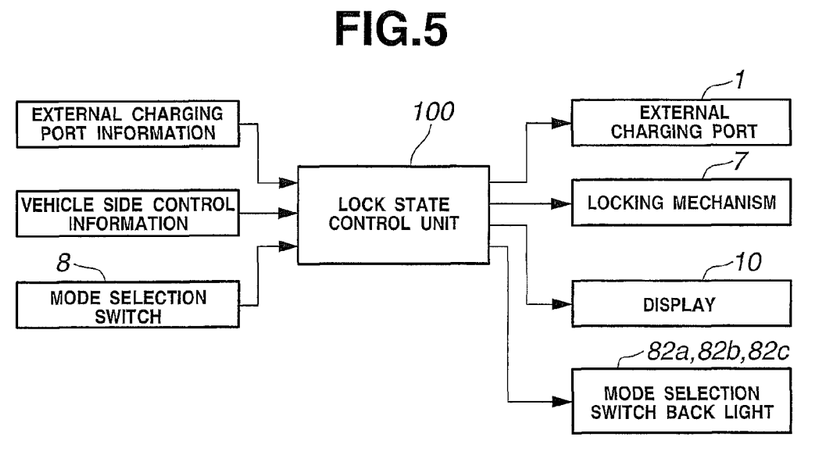
FIG. 5 is a block diagram showing a control configuration of a lock state control unit of the embodiment 1.

FIG. 5 is a block diagram showing a control configuration of a lock state control unit of the embodiment 1. A lock state control unit 100 receives predetermined information about an external charging port from the charging stand 1, and inputs vehicle side control information for calculating information concerning the use of power supplied from the charging stand 1 side in the vehicle, and further receives information selected by an after-mentioned mode selection switch 8. The lock state control unit 100 then selects the lock mode of the locking mechanism 7 on the basis of each information, and operates the locking mechanism 7 along contents of the selected lock mode.

Figure 7:
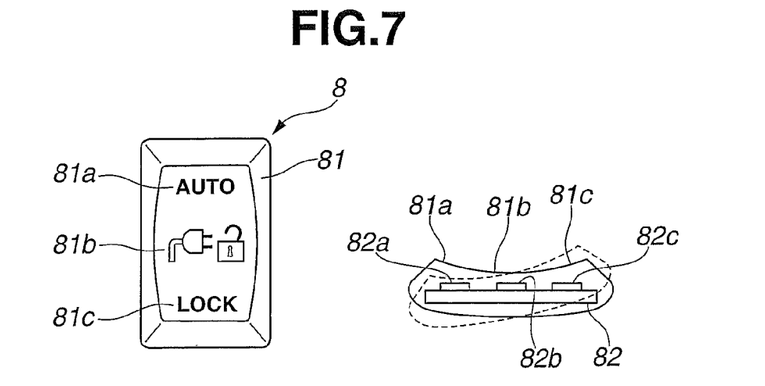
FIG. 7 is a schematic view showing a configuration of a mode selection switch of the embodiment 1.

FIG. 7 is a schematic view showing a configuration of the mode selection switch of the embodiment 1. The mode selection switch 8 is a three range seesaw type switch. An upper stage is an AUTO 81*a* for selecting the first mode, a middle stage is an UNLOCK 81*b* for selecting the third mode which sets the locking mechanism 7 to the full-time unlock state, and a lower stage is a LOCK 81*c* for selecting the second mode which sets the locking mechanism 7 to the full-time lock state. Since the first and second modes are arranged on both sides of the third mode of the unlock state with the third mode being a center as described above, the driver can readily select the mode. Further, since the lock is done by operating the switch from a neutral position to either direction, easy operability is obtained when desiring the lock state. Characters (or Letters) and/or illustration part of this switch are formed by resin having light permeability, and LED lamps (LED lights) 82*a*, 82*b* and 82*c* are provided in bottom surface positions corresponding to the respective modes of the mode selection switch 8. When the mode selection switch 8 is operated by the driver, the LED light corresponding to the selected mode continues to go up (light up) for a first predetermined time after an ignition switch is turned off, then goes out afterwards. With this, the driver can visually recognize the currently selected mode easily from the outside of the vehicle when the driver gets out of the vehicle and operates the charging connector 2 in an ignition-off state.

Figure 8:
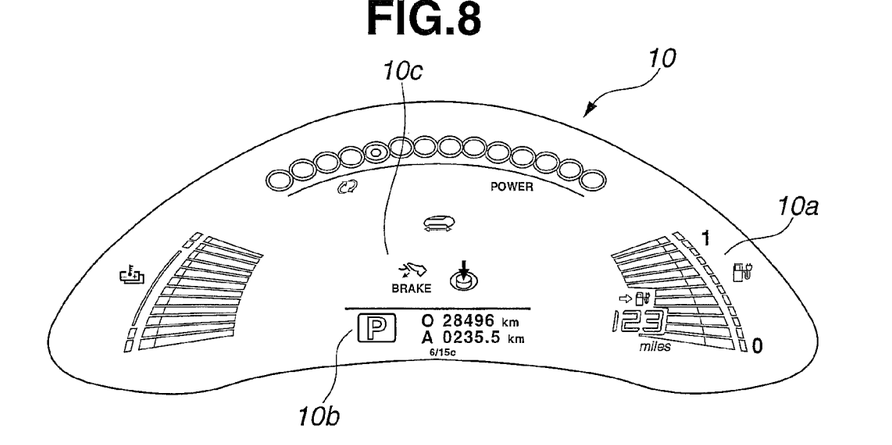
FIG. 8 is a schematic view showing a monitor display of the embodiment 1.

FIG. 8 is a schematic view showing a monitor display of the embodiment 1. A monitor display 10 is disposed on a front side of driver's seat, and displays a vehicle speed, torque, a battery remaining meter 10*a* and a shift lever position 10*b*. The monitor display 10 has on the monitor display an indicating section 10*c* that indicates the mode (contents of the mode) selected by the lock state control unit 100 (or the mode selection switch 8). This indicating section 10*c* continues to indicate the mode for a second predetermined time that is shorter than the first predetermined time after the ignition is turned off. With this, the driver is seated just after the ignition-off, and by indicating the mode on the display whose visibility is the highest in this point, it is possible to increase degree of driver's mode recognition. Further, after getting out of the vehicle, the monitor display 10 is hard to see, and the indication by the display consumes much power in comparison with the light-on of the LED light. Thus, by lengthening time of the light-on of the LED light which has high visibility from the outside after getting out of the vehicle and has low power consumption, it is possible to increase the degree of driver's mode recognition while suppressing the power consumption.

Figure 9:
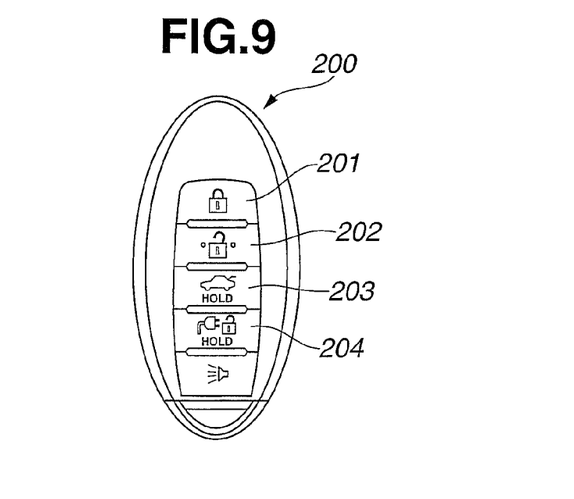
FIG. 9 is a schematic view showing an intelligent key of the vehicle, of the embodiment 1.

FIG. 9 is a schematic view showing an intelligent key of the vehicle, of the embodiment 1. This key device 200 has, in an order from the upper side, a door lock button 201, a door lock release button 202, a trunk opener 203, a lock release button 204 and the like. When the driver operates these buttons after getting out of the vehicle, a signal is transmitted to the vehicle by radio, and an operation according to a function of each button is performed. Even in either case of the lock state by the first mode or the full-time lock state by the second mode, when the lock release button 204 is pushed (or pressed), the locking mechanism 7 is brought to the unlock state. On the other hand, in the case of the unlock state, the state does not change at all. Therefore, in a case where the charge is not completed and the locking mechanism 7 is in the lock state, when the driver intends to release the lock, by operating the lock release button 204, the lock can be released and the charging connector 2 can be detached.

(Mode Control Process)

Figure 10:
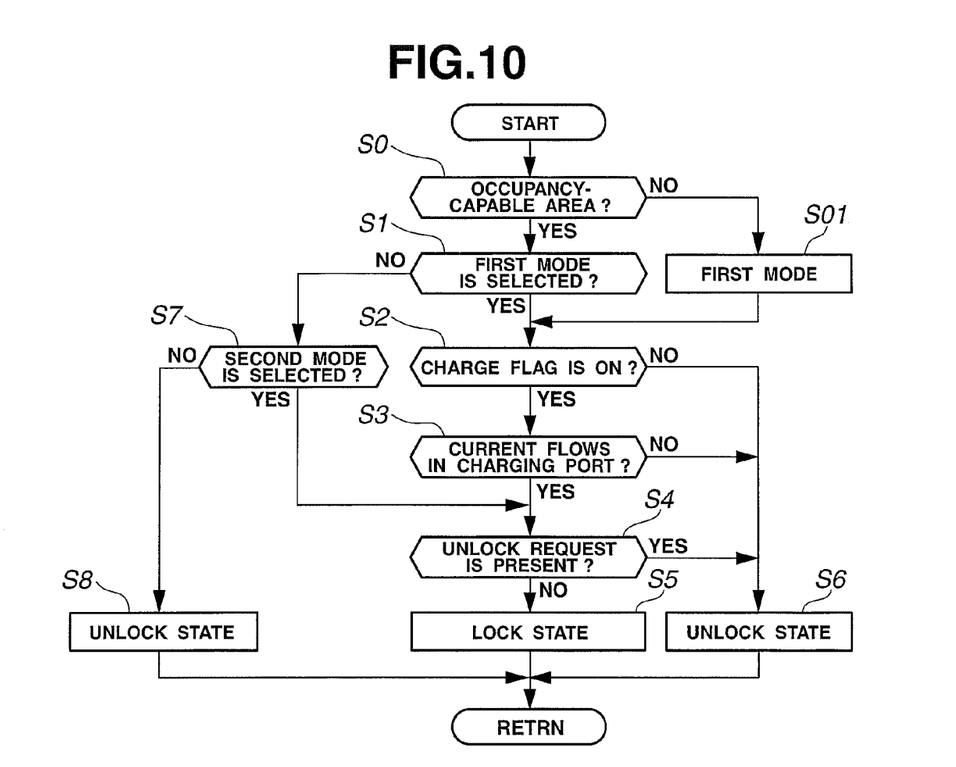
FIG. 10 is a flow chart showing a mode control process according to the embodiment 1.

Next, a mode control process in the lock state control unit 100 will be explained. FIG. 10 is a flow chart showing the mode control process according to the embodiment 1.

At step S0, a judgment is made as to whether or not the place is the occupancy-capable area, on the basis of the information sent from the charging stand 1 side when connecting the charging connector 2. When judged that the place is the occupancy-capable area, the routine proceeds to step S1. Otherwise, namely, when judged that the place is the occupancy-incapable area, the routine proceeds to step S01, and the first mode is set, then the routine proceeds to step S2. In other words, in the occupancy-incapable area, regardless of the information of the mode selection switch 8 which is selected by the driver, the first mode is selected. With this selection, an excessive occupancy in the occupancy-incapable area is avoided.

At step S1, a judgment is made as to whether or not the mode selection switch 8 selects the AUTO 81*a* (the first mode). If the AUTO 81*a* is selected, the routine proceeds to step S2. If not, the routine proceeds to step S7.

At step S2, a judgment is made as to whether or not a charge flag is ON. If the charge flag is ON, the routine proceeds to step S3. If not, the routine proceeds to step S6. Here, the charge flag is a flag that is detected on the basis of the vehicle side control information. The presence or absence of a rechargeable capacity space is judged at a battery side, then if the rechargeable capacity space is present, the charge flag is ON. If not, namely, in a case of a fully-charged state, the charge flag is OFF.

At step S3, a judgment is made as to whether or not current flows in the charging port 4. If the current flows in the charging port 4, the routine proceeds to step S4. If not, the routine proceeds to step S6. This is because if the current does not flow, there is no use in holding the charging connector 2 connected. Here, necessity of detection of the presence or absence of the current will be explained separately.

At step S4, the presence or absence of an unlock request is judged. When judged that the unlock request is present, the routine proceeds to step S6. When judged that no unlock request is present, the routine proceeds to step S5.

At step S5, the locking mechanism 7 is set to the lock state.

At step S6, the locking mechanism 7 is set to the unlock state.

At step S7, a judgment is made as to whether or not the second mode is selected. If the second mode is selected, the routine proceeds to step S4 and to step S5, and the locking mechanism 7 is set to the lock state. On the other hand, if the second mode is not selected, it is judged that the third mode is selected, and the routine proceeds to step S8, and the locking mechanism 7 is set to the unlock state.

Figure 11:
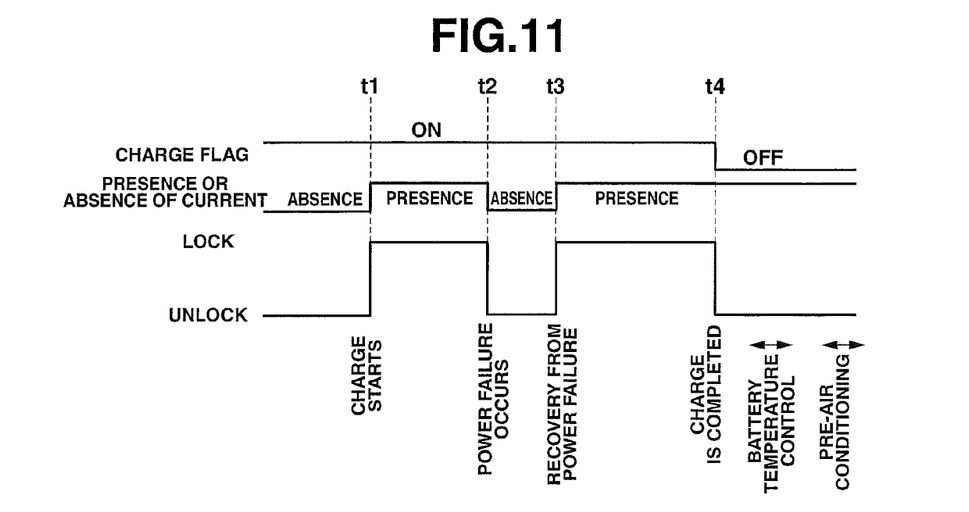
FIG. 11 is a time chart showing change of a lock state when a first mode is selected, of the embodiment 1.

FIG. 11 is a time chart showing change of a lock state when the first mode is selected, of the embodiment 1. In this time chart, as an initial state, the rechargeable capacity space is present in the battery, and the locking mechanism 7 is in the unlock state, and further the mode selection switch 8 selects the AUTO 81*a* (the first mode).

At time t1, when the driver connects the charging connector 2, the locking mechanism 7 is set to the lock state, and the charge is started.

At time t2, when a power failure occurs, since the current does not flow in the charging port 4 even if there is a charge request, the locking mechanism 7 is brought to the unlock state. Regarding this unlock state, for instance, in the event that there is a need for an administrator of the charging facility to remove the charging connector 2 from the charging port 4 for some reason even during the charge, by tripping a breaker of the charging stand 1, it is possible to set the locking mechanism 7 to the unlock state.

At time t3, when the power failure is finished, since the current starts to flow in the charging port 4, the lock state is selected again.

At time t4, when the charge is completed, the charge flag is set to OFF. Then, in response to this flag, the locking mechanism 7 is set to the unlock state. Thereafter, if a control, such as a battery temperature control that is a heat control of a battery temperature by the power from the charging stand 1 side and a pre-air conditioning to ensure an appropriate vehicle interior temperature at a setting time, is performed by a setting of the vehicle side, the current flows. However, since the locking mechanism 7 is in the unlock state, when it is inappropriate to occupy the charging stand 1, the others can remove the charging connector 2 from the charging port 4.

In view of the foregoing, the embodiment 1 includes the following configuration and effect.

(1) A charging-port control device includes a charging port 4 having a protrusion 41*a* (an engaged portion) to which a nail portion 23*d* (an engaging portion) of a charging connector 2 is connected by user's operation and being supplied with power from an external power source in an engagement state; a locking mechanism 7 achieving a lock state in which release of the engagement state is restrained when the nail portion 23*d* and the protrusion 41*a* are in the engagement state by limiting a releasing operation of the nail portion 23*d* and achieving an unlock state by allowing the releasing operation; and a lock state control unit 100 controlling the locking mechanism 7 to the lock state or the unlock state. The lock state control unit 100 has a first mode for controlling the locking mechanism 7 to the lock state only when a charge request is being outputted from a vehicle side.

Therefore, since a situation in which the charging connector 2 is unexpectedly released during the charge can be avoided, it is possible to prevent the theft of the charging cable and to avoid the situation in which the charge is not completed yet when the driver comes back after the scheduled charging time elapses. Further, since it is possible to prevent the charging facility from being unnecessarily occupied in the public charging facilities, a charging efficiency can be increased.

(2) A charging-port control device includes a charging port 4 having a protrusion 41*a* (an engaged portion) to which a nail portion 23*d* (an engaging portion) of a charging connector 2 is connected by user's operation and being supplied with power from an external power source in an engagement state; a locking mechanism 7 achieving a lock state in which release of the engagement state is restrained when the nail portion 23*d* and the protrusion 41*a* are in the engagement state by limiting a releasing operation of the nail portion 23*d* and achieving an unlock state by allowing the releasing operation; and a lock state control unit 100 controlling the locking mechanism 7 to the lock state or the unlock state. The lock state control unit 100 has a first mode for controlling the locking mechanism 7 to the lock state only when power is being supplied to the charging port 4.

Therefore, since a situation in which the charging connector 2 is unexpectedly released during the charge can be avoided, it is possible to prevent the theft of the charging cable and to avoid the situation in which the charge is not completed yet when the driver comes back after the scheduled charging time elapses. Further, since it is possible to prevent the charging facility from being unnecessarily occupied in the public charging facilities, a charging efficiency can be increased. In addition, in the event that there is a need for the administrator of the charging facility to remove the charging connector 2, by tripping the breaker of the charging stand 1, the power supply can be stopped. Then by bringing the locking mechanism 7 to the unlock state, the administrator can remove the charging connector 2. Thus, this can cope with various situations.

(3) The lock state control unit 100 has a second mode for maintaining the full-time lock state. Therefore, when the charging place is the occupancy-capable charging facility, the charging cable is not detached unexpectedly, thereby preventing the theft.

(4) The lock state control unit 100 has a third mode for maintaining the full-time unlock state. Therefore, the unlock state can be selected in the charging facility where the lock is not required or the lock is not allowed. Further, when the locking mechanism 7 is in the lock state, by changing the mode, it is possible to easily set the locking mechanism 7 to the unlock state.

(5) A mode selection switch 8 that can select the mode of the lock state control unit is provided in a vehicle interior. Therefore, the drive can change the mode readily according to the charging facility.

(6) The mode selection switch 8 has an LED light (a light) 82a; 82b; 82c, corresponding to a selected mode portion, which goes up, and this LED light 82 of the selected mode portion continues to go up for the first predetermined time after the ignition switch is turned off and goes out afterwards.

Therefore, when driver's consciousness after the ignition-off is directed to a charging operation, the driver can check or confirm the selected mode.

(7) The mode selection switch 8 is a switch that selects the first mode, the second mode for maintaining the full-time lock state and the third mode for maintaining the full-time unlock state, and the first mode and the second mode are arranged on both sides of the third mode with the third mode being a center.

Therefore, the driver can readily select the mode. Further, since the lock is done when operating the switch from a neutral position to either direction, easy operability is obtained when desiring the lock state.

(8) Contents of the mode carried out by the lock state control unit 100 is displayed on a display provided in the vehicle interior for the second predetermined time after the ignition switch is turned off. Therefore, by displaying the mode (the contents of the mode) on the display whose visibility is high to the driver, the driver can select the proper mode for the charging facilities.

(9) An LED light 82 which can select the mode of the lock state control unit 100 and whose corresponding selected mode portion goes up is provided in the vehicle interior, and the LED light 82 has a mode selection switch 8 whose selected mode portion continues to go up for the first predetermined time after the ignition switch is turned off and goes out afterwards, and the second predetermined time is set to be shorter than the first predetermined time.

Therefore, by indicating the mode on the display 10 whose visibility might be the highest at a time when the ignition-off, it is possible to increase degree of driver's mode recognition. Further, after getting out of the vehicle, the monitor display 10 is hard to see, and the indication by the display consumes much power in comparison with the light-on of the LED light. Thus, by lengthening time of the light-on of the LED light which has high visibility from the outside after getting out of the vehicle and has low power consumption, it is possible to increase the degree of driver's mode recognition while suppressing the power consumption.

(10) The lock state control unit 100 has a step S0 (an occupancy capable/incapable judgment section) that judges whether or not the charging place can be occupied upon charging. When judged that the charging place can not be occupied, the first mode is selected, and when judged that the charging place can be occupied, the second mode or the third mode for maintaining the full-time unlock state is selected.

Therefore, in the occupancy-incapable area, regardless of the information of the mode selection switch 8 selected by the driver, the first mode is selected, thereby avoiding excessive occupancy in the occupancy-incapable area.

(11) A lock release button 204 (an unlock switch) of an intelligent key 200 which can output an unlock request regardless of the mode of the lock state control unit 100 is provided, and when the unlock request is outputted from the lock release button 204, the lock state control unit 100 gives priority to the unlock request.

Therefore, it is possible to release the lock state along driver's intention, then ease of use can be increased.

Embodiment 2

Figure 12:
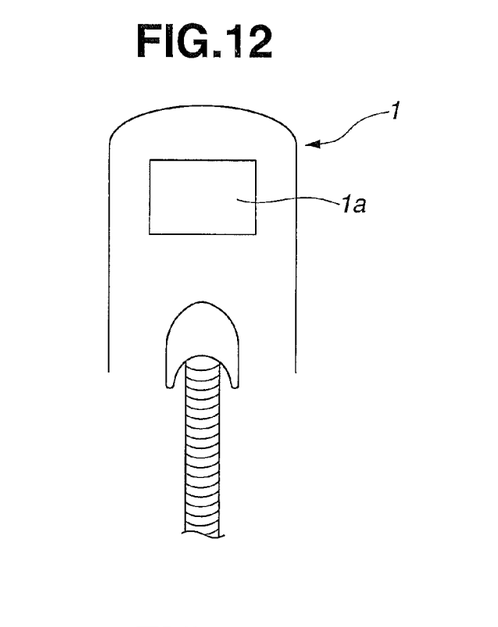
FIG. 12 is a schematic view showing a configuration of a charging stand according to an embodiment 2.

Next, an embodiment 2 will be explained. Since a basic structure or configuration is the same as that of the embodiment 1, only a different point will be explained. FIG. 12 is a schematic view showing a configuration of a charging stand according to the embodiment 2. In the embodiment 2, the charging stand 1 has a display section 1a that displays the selected mode. The mode information is transmitted from the vehicle side. With this, the other users who use the charging facility also can understand whether the charge is being done in the lock-releasable mode. Therefore, for instance, in a case where an owner of the vehicle does not come back after the charge is completed, the other user can detach the charging connector 2 and attach it to his/her own vehicle, which can increase the efficiency of the charging facilities.

(12) The lock state control unit 100 is configured to output current mode information to an external charging port side. Therefore, the charging stand side utilizes the mode information, thereby increasing ease of use.

Embodiment 3

Figure 13:
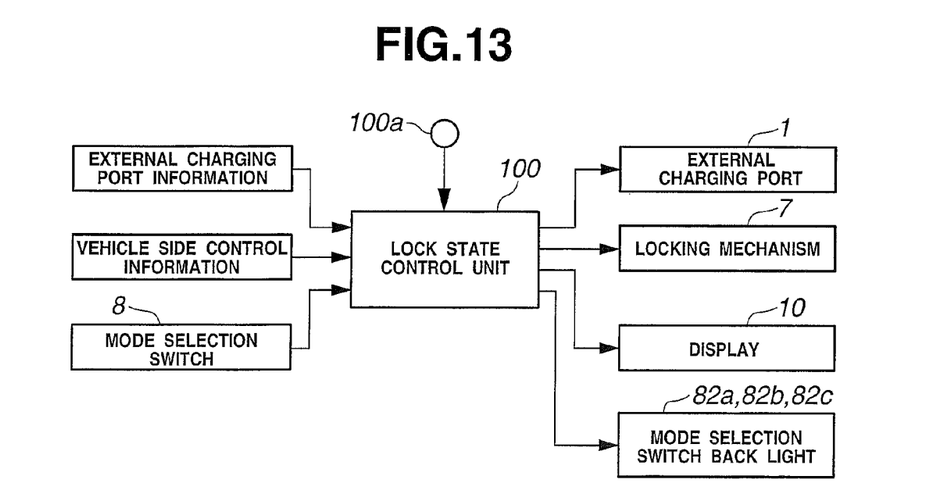
FIG. 13 is a block diagram showing a control configuration of a lock state control unit according to an embodiment 3.

Next, an embodiment 3 will be explained. Since a basic structure or configuration is the same as that of the embodiment 1, only a different point will be explained. FIG. 13 is a block diagram showing a control configuration of a lock state control unit according to the embodiment 3. The lock state control unit 100 is provided with an external command receiving section 100a that can set the mode to the first mode on the basis of external information. Thus, even in a case where the mode except the first mode is selected by driver's incorrect operation of the mode selection switch 8 or due to the fact that the driver operates the mode selection switch 8 by mistake despite the charging facility in the occupancy-incapable area, for instance, by transmitting a signal from the administrator of the charging facility, a mode change to the first mode can be forcibly made.

(13) The lock state control unit 100 has an external command receiving section 100*a* that can set the mode to the first mode on the basis of vehicle external information regardless of the mode state carried out by the lock state control unit.

Therefore, even when the driver's incorrect mode selection is made, the mode can be forcibly changed to a proper mode, thereby increasing ease of use and efficiency in the charging facilities.

Although the invention has been described above by reference to certain embodiments of the invention, the invention is not limited to the embodiment described above. The embodiment 1 shows, as an example, the charging port that is provided on the vehicle front side. However, the charging port could be provided on a vehicle rear side or on a vehicle side surface. Further, although the embodiments above show the electric vehicle, the present invention can be also applied to a plug-in hybrid vehicle etc.

The invention claimed is:

1. A charging-port control device for an electric vehicle comprising:
    a charging port engaged with a charging connector;
    a locking mechanism configured to limit release of an engagement state between the charging connector and the charging port; and
    a lock state control unit configured to control the locking mechanism to a lock state or an unlock state, the lock state control unit comprising a first mode for controlling the locking mechanism to the lock state only when a charge request is being outputted from a vehicle side and a third mode for maintaining a full-time unlock state,
    wherein the third mode maintains the unlock state even during a charge.

2. The charging-port control device for the electric vehicle as claimed in claim 1, wherein:
    the lock state control unit comprises a second mode for maintaining a full-time lock state.

3. The charging-port control device for the electric vehicle as claimed in claim 2, wherein:
    the lock state control unit comprises an occupancy judgment section that judges whether or not a charging place can be occupied upon charging,
    when judged that the charging place cannot be occupied, the first mode is selected, and
    when judged that the charging place can be occupied, one of the second mode and the third mode is selected.

4. The charging-port control device for the electric vehicle as claimed in 3, further comprising:
    an unlock switch configured to output an unlock request regardless of the mode of the lock state control unit,
    wherein when the unlock request is outputted from the unlock switch, the lock state control unit gives priority to the unlock request.

5. The charging-port control device for the electric vehicle as claimed in claim 1, wherein:
    a mode selection switch configured to select the mode of the lock state control unit is provided in a vehicle interior.

6. The charging-port control device for the electric vehicle as claimed in claim 5, wherein:
    the mode selection switch comprises a light, corresponding to a selected mode portion, that turns on, and
    the light of the selected mode portion continues to stay on for a first predetermined time after an ignition switch is turned off, and turns off afterward.

7. The charging-port control device for the electric vehicle as claimed in claim 5, wherein:
    the mode selection switch comprises a switch that selects the first mode, a second mode for maintaining the full-time lock state, and the third mode, and
    the first mode and the second mode are arranged on both sides having the third mode at a center therebetween.

8. The charging-port control device for the electric vehicle as claimed in claim 1, wherein:
    contents of the mode carried out by the lock state control unit is displayed on a display provided in the vehicle interior for a second predetermined time after the ignition switch is turned off.

9. The charging-port control device for the electric vehicle as claimed in claim 8, wherein:
    a light configured to select the mode of the lock state control unit is provided in the vehicle interior,
    the light comprises a mode selection switch having a selected mode portion turn on for the first predetermined time after the ignition switch is turned off and turns off afterward, and
    the second predetermined time is shorter than the first predetermined time.

10. The charging-port control device for the electric vehicle as claimed in claim 1, wherein:
    the lock state control unit is configured to output current mode information to an external charging port side.

11. The charging-port control device for the electric vehicle as claimed in claim 1, wherein:
    the lock state control unit comprises an external command receiving section configured to forcibly set the mode to the first mode by a command signal external to the vehicle regardless of the mode state carried out by the lock state control unit.

12. A charging-port control device for an electric vehicle comprising:
    a charging port engaged with a charging connector;
    a locking mechanism configured to limit release of an engagement state between the charging connector and the charging port; and
    a lock state control unit configured to control the locking mechanism to a lock state or an unlock state, the lock state control unit having a first mode for controlling the locking mechanism to the lock state only when power is being supplied to the charging port and a third mode for maintaining a full-time unlock state,
    wherein the third mode maintains the unlock state even during a charge.

13. The charging-port control device for the electric vehicle as claimed in claim 12, wherein:
    the lock state control unit comprises a second mode for maintaining a full-time lock state.

14. The charging-port control device for the electric vehicle as claimed in claim 13, wherein:
    the lock state control unit comprises an occupancy judgment section that judges whether or not a charging place can be occupied upon charging,
    when judged that the charging place cannot be occupied, the first mode is selected, and
    when judged that the charging place can be occupied, one of the second mode and the third mode is selected.

15. The charging-port control device for the electric vehicle as claimed in claim 14, further comprising:
    an unlock switch configured to output an unlock request regardless of the mode of the lock state control unit,
    wherein when the unlock request is outputted from the unlock switch, the lock state control unit gives priority to the unlock request.

16. The charging-port control device for the electric vehicle as claimed in claim 12, wherein:
  a mode selection switch configured to select the mode of the lock state control unit is provided in a vehicle interior.

17. The charging-port control device for the vehicle for the electric vehicle as claimed in claim 16, wherein:
  the mode selection switch comprises a light, corresponding to a selected mode portion, that turns on, and
  the light of the selected mode portion continues to stay on for a first predetermined time after an ignition switch is turned off, and turns off afterward.

18. The charging-port control device for the electric vehicle as claimed in claim 16, wherein:
  the mode selection switch comprises a switch that selects the first mode, a second mode for maintaining the full-time lock state, and the third mode, and
  the first mode and the second mode are arranged on both sides having the third mode at a center therebetween.

19. The charging-port control device for the electric vehicle as claimed in claim 12, wherein:
  contents of the mode carried out by the lock state control unit is displayed on a display provided in the vehicle interior for a second predetermined time after the ignition switch is turned off.

20. The charging-port control device for the electric vehicle as claimed in claim 19, wherein:
  a light configured to select the mode of the lock state control unit is provided in the vehicle interior,
  the light comprises a mode selection switch having a selected mode portion turn on for the first predetermined time after the ignition switch is turned off and turns off afterward, and
  the second predetermined time is shorter than the first predetermined time.

21. The charging-port control device for the electric vehicle as claimed in claim 12, wherein:
  the lock state control unit is configured to output current mode information to an external charging port side.

22. The charging-port control device for the electric vehicle as claimed in claim 12, wherein:
  the lock state control unit comprises an external command receiving section configured to forcibly set the mode to the first mode by a command signal external to the vehicle regardless of the mode state carried out by the lock state control unit.

* * * * *